United States Patent
Kim

(10) Patent No.: US 7,758,072 B2
(45) Date of Patent: Jul. 20, 2010

(54) PRESSURE CONTROL APPARATUS OF AIR BAG

(75) Inventor: Kyong Cheol Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 249 days.

(21) Appl. No.: 11/971,601

(22) Filed: Jan. 9, 2008

(65) Prior Publication Data
US 2009/0001698 A1    Jan. 1, 2009

(30) Foreign Application Priority Data
Jun. 26, 2007    (KR) ............... 10-2007-0063141

(51) Int. Cl.
*B60R 21/239*    (2006.01)
(52) U.S. Cl. .................... 280/739; 280/743.2
(58) Field of Classification Search ........ 280/739, 280/743.2, 736, 742
See application file for complete search history.

(56) References Cited
U.S. PATENT DOCUMENTS
3,787,067 A  *  1/1974  Bernard ............... 280/736
2004/0232675 A1 * 11/2004 Marotzke ............... 280/739
2006/0290117 A1 * 12/2006 Fischer et al. ........... 280/739
2006/0290118 A1 * 12/2006 Thomas ................ 280/739
2007/0075537 A1 *  4/2007 Rust .................... 280/739
2008/0203707 A1 *  8/2008 Fischer et al. .......... 280/728.2

* cited by examiner

*Primary Examiner*—Paul N Dickson
*Assistant Examiner*—Keith Frisby
(74) *Attorney, Agent, or Firm*—Morgan, Lewis & Bockius LLP

(57) ABSTRACT

Disclosed is a pressure control apparatus of an airbag, which can obtain the same performance as in case of using a dual stage inflator even in case of using a single stage inflator deploying an airbag cushion by an explosive force of an explosive charge caused by the ignition of one igniter by having a pressure control apparatus for selectively communicating the interior of an airbag cushion and the exterior of an airbag housing without using the dual stage inflator deploying the airbag cushion by an explosive force of an explosive charge caused by the ignition of two igniters.

14 Claims, 3 Drawing Sheets

PRESSURE CONTROL APPARATUS OF AIR BAG

CROSS-REFERENCE TO RELATED APPLICATION

This application claims the benefit of Korean Application No. 2007-0063141, filed Jun. 26, 2007 in the Korean Intellectual Property Office, the disclosure of which is incorporated herein by reference.

BACKGROUND OF THE INVENTION

1. Field of the Invention

The present invention relates to a pressure control apparatus of an airbag, and more particularly, to a pressure control apparatus of an airbag, which can perform as a dual stage inflator even in case of using a single stage inflator by having a pressure control apparatus for selectively communicating the interior of an airbag cushion and the exterior of an airbag housing without using the dual stage inflator.

2. Description of the Related Art

FIG. 1 is a schematic view showing an airbag system of a vehicle according to the conventional art. FIG. 2 is a schematic view showing a conventional dual stage inflator.

A conventional airbag is adapted such that an airbag cushion may be deployed to a passenger side in the event that a car crash occurs at a specified speed, and the passenger protection standards are designed such that an average adult male may receive optimal protection in a specified posture. This condition is set forth as normal seating condition. Thus, if a passenger is in an unsafe posture, or has a physique smaller than the average physique, or is a child hereinafter, abbreviated as "abnormal seating condition" or "OOP (out of position) condition"), they may be seriously injured due to a high pressure upon deployment of the airbag cushion of the conventional airbag device.

The airbag system in accordance with the conventional art includes, as shown in FIG. 1, an airbag housing 2, an impact detection sensor (not shown) for detecting an impact in the event of a collision of a vehicle, a dual stage inflator 1 for instantaneously inflating gas, and an airbag cushion 3 disposed within the airbag housing 2 and deployed upon collision.

Here, the dual stage inflator 1 refers to, as shown in FIG. 2, an inflator that is configured to expand the airbag cushion 3 along with the blow out of a powder gas caused by the explosive force of an explosive charge and has two or more igniters 1a and 1b for igniting the explosive charge.

The operational procedure of the thus-constructed airbag system in accordance with the conventional art will be described below.

First, as shown in FIGS. 1 and 2, when the impact detection sensor (not shown) detects an impact of a predetermined magnitude or more, a control unit selectively ignites any one or both of the two igniters 1a and 1b according to whether a high or low pressure deployment of the airbag cushion 3 is required.

At this time, the control unit is programmed to make instruction signal to the dual stage inflator 1, based on a pre-set state condition of collision, in conjunction with a vehicle speed sensor (not shown) and a seat position detection sensor (not shown) for detecting the distance between a seat (not shown) on which a passenger is seated and an airbag module.

The state condition of collision may be a high pressure deployment condition in which a high pressure deployment of the airbag cushion 3 is required and a low pressure deployment in which a low pressure deployment is required. The high pressure deployment condition corresponds to the normal seating condition and the low pressure deployment condition corresponds to the normal seating condition or OOP condition set forth above.

In other words, the control unit ignites both of the igniters 1a and 1b if a high pressure deployment condition of the airbag cushion 3 is required, and ignites one of the igniters 1a and 1b if a low pressure deployment condition is required, thereby effectively protecting the passenger in a normal seating condition or OOP condition.

Next, if the igniters 1a and/or 1b are ignited by control of the control unit, the airbag cushion 3 is expanded with a high pressure or a low pressure by the blow out of a powder gas caused by the explosion of an explosive charge, and thus deployed toward the passenger.

However, the above-described airbag system in accordance with the conventional art has the problem since it is necessary to provide a costly dual stage inflator for selectively performing high pressure deployment or low pressure deployment of the airbag cushion in order to effectively protect a passenger in both normal seating condition and abnormal seating condition.

Such a dual stage inflator is expensive compared to a single stage inflator generating a single pressure, and this causes an increase in the production cost of the product.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the problems of the conventional art and provide a pressure control apparatus using a single stage inflator, which can obtain the same performance as a dual stage inflator by selectively communicating the interior of an airbag cushion and the exterior of an airbag housing without using the conventional dual stage inflator.

To achieve the foregoing objects of the present invention, there is provided a pressure control apparatus of an airbag, comprising: a cylinder disposed to pass through the interior and exterior of an airbag housing, a piston disposed to be slidably movable within the cylinder, a pressing member disposed within the cylinder to press the piston in an outward direction of the airbag housing, and a tether, a distal end portion of which is connected to at least a portion of the interior of the airbag cushion placed within the airbag housing and a proximate end portion of which is connected to a proximate end portion of the piston, wherein the cylinder has at least a gas inlet positioned inside the airbag housing for communicating the interior of the airbag cushion and the interior of the cylinder and at least a gas outlet positioned outside the airbag housing for communicating the interior of the cylinder and the exterior of the airbag housing.

Additionally, the tether has such a length as to pull the piston in the inner direction of the airbag housing to block a fluid communication between the interior of the airbag cushion and the exterior of the airbag housing by a tensile force upon full deployment of the airbag cushion.

Additionally, a stopper is formed within the cylinder which engages with the piston slidably moved within the cylinder after full deployment of the airbag cushion to stop the piston from being restored to the home position by the pressing member.

Additionally, the stopper is supported by an elastic member so as to be protruded into the cylinder.

Additionally, a stopping groove for stopping the stopper is formed at the piston.

Additionally, the pressing member is an elastic member supported by a distal end portion of the cylinder and supporting the proximate end portion of the piston.

Additionally, the pressing member is a coil spring that is disposed in a compressed state within the cylinder.

Additionally, the cylinder is assembled to the airbag housing with bolts.

Additionally, the piston has at least a length enough to be slidably moved within the cylinder and fully blocks the gas outlet formed at the cylinder upon full deployment of the airbag cushion.

Finally, an inflator is further placed at the airbag housing which deploys the airbag cushion by the explosive force of an explosive charge that is to explode by the ignition of one igniter.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an embodiment of the present invention will be described in detail with reference to the drawings.

Figure 1:
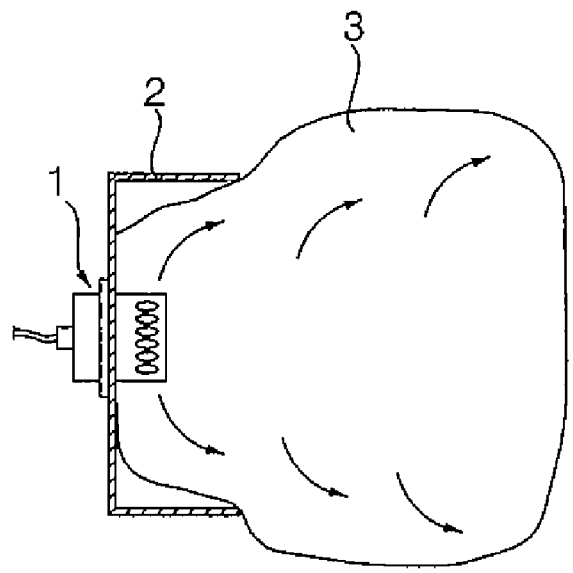
FIG. 1 is a schematic view showing an airbag system of a vehicle according to the conventional art.
Figure 2:
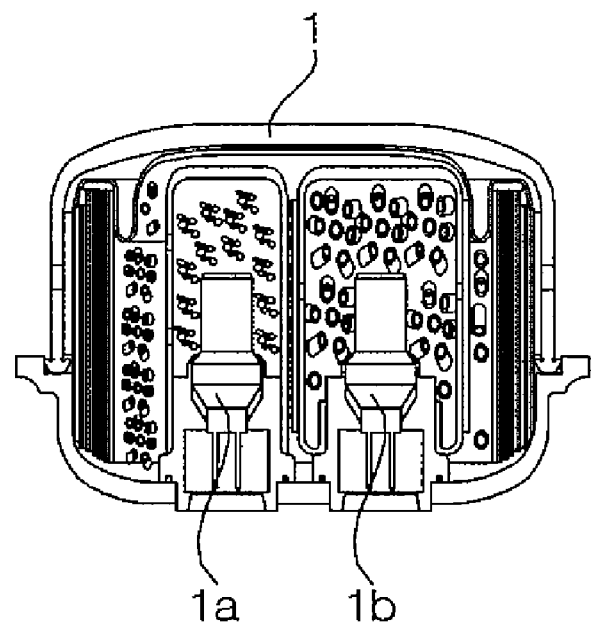
FIG. 2 is a schematic view showing a conventional dual stage inflator.
Figure 3:
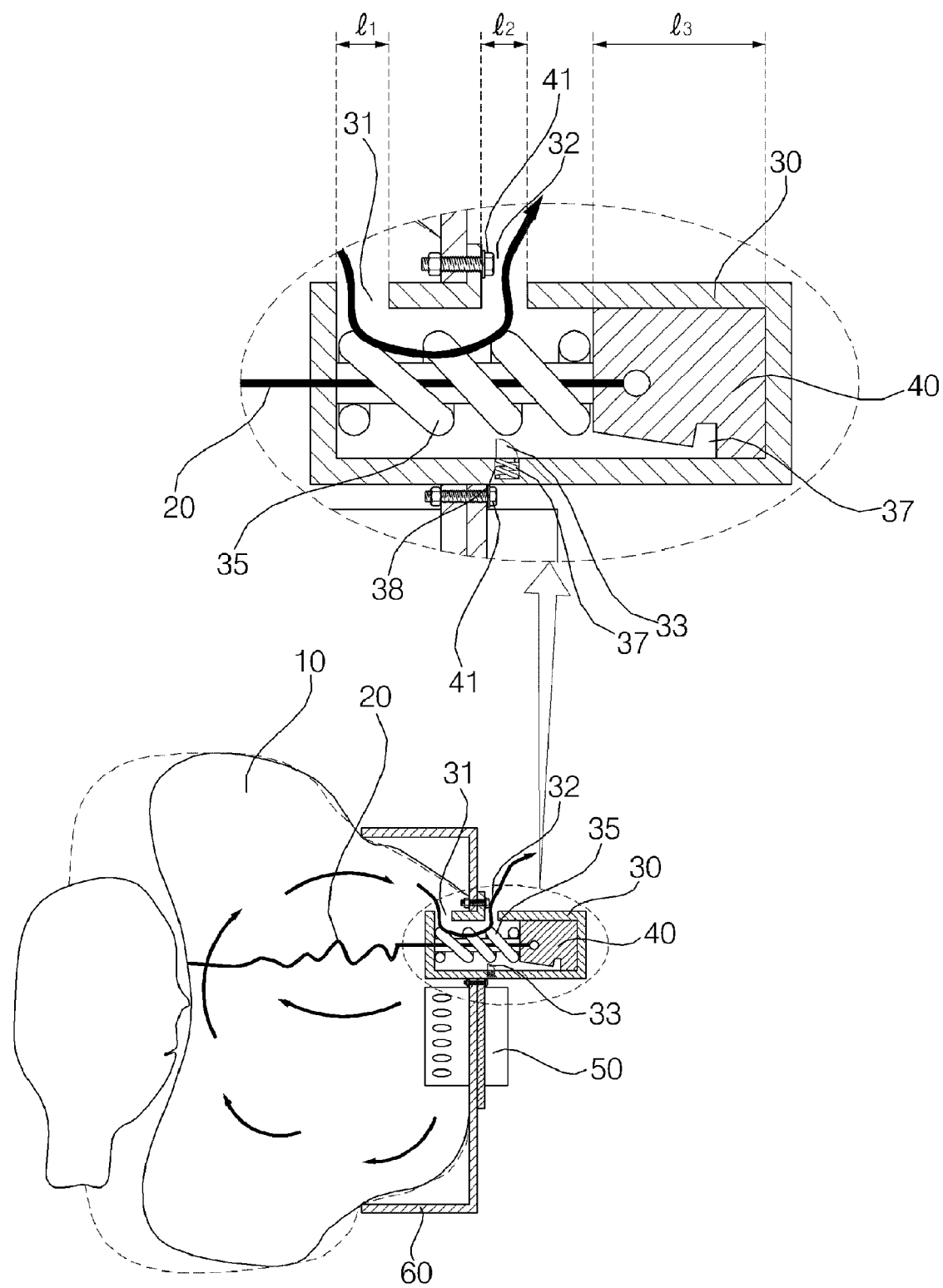
FIG. 3 is a schematic view showing an airbag pressure control apparatus before an airbag cushion is fully deployed in accordance with an exemplary embodiment of the present invention.
Figure 4:
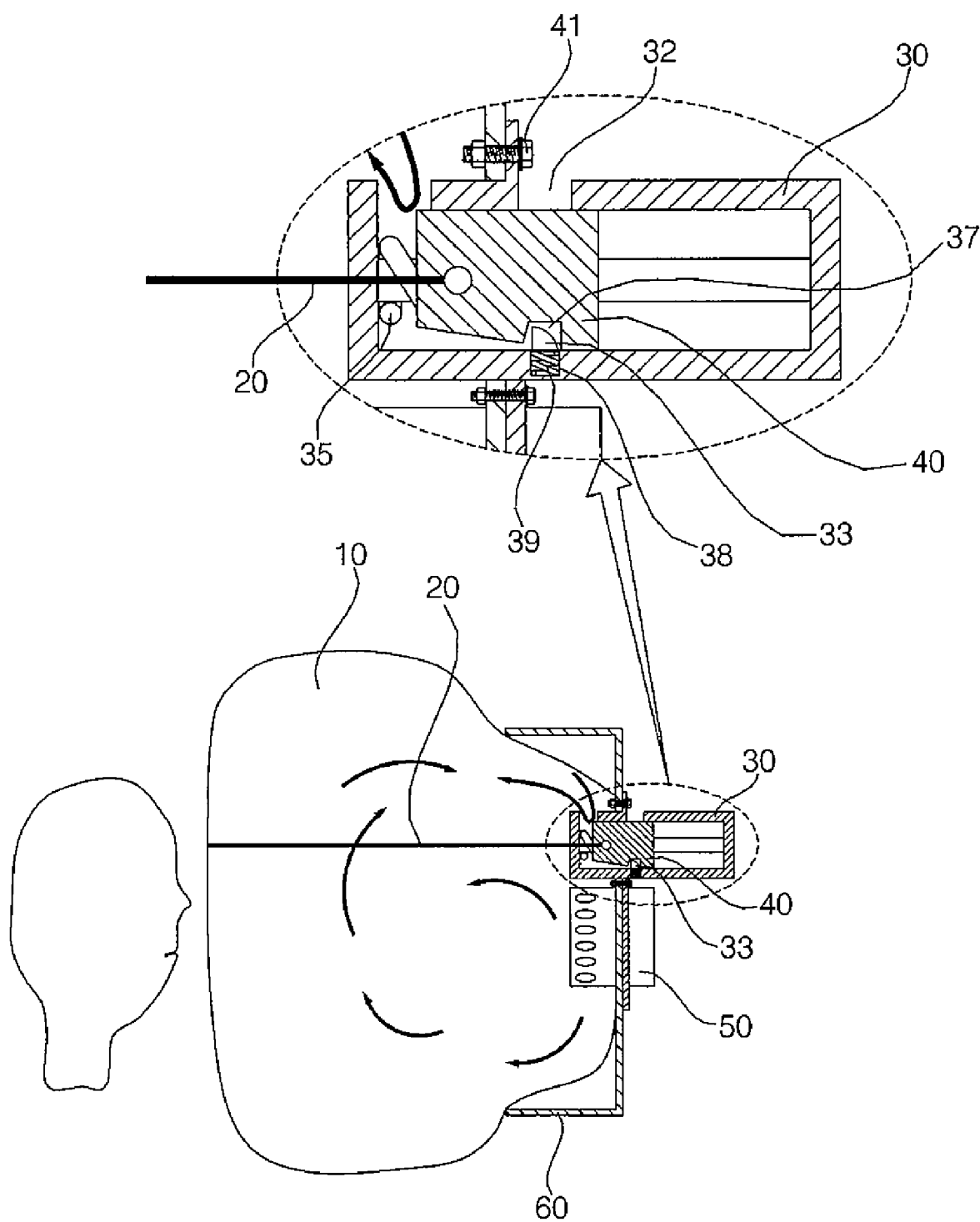
FIG. 4 is a schematic view showing an airbag pressure control apparatus after an airbag cushion is fully deployed in accordance with an exemplary embodiment of the present invention.

FIG. 3 is a schematic view showing an airbag pressure control apparatus before an airbag cushion is fully deployed in accordance with an exemplary embodiment of the present invention. FIG. 4 is a view showing an airbag pressure control apparatus after an airbag cushion is fully deployed in accordance with an exemplary embodiment of the present invention.

The pressure control apparatus of an airbag in accordance with an exemplary embodiment of the present invention includes, as shown in FIG. 3, a cylinder 30 disposed to pass through the interior and exterior of an airbag housing 60, a piston 40 disposed to be slidably movable within the cylinder 30, a pressing member 35 disposed within the cylinder 30 to press the piston 40 in an outward direction of the airbag housing 60, and a tether 20, a distal end portion of which is connected to a portion of the interior of the airbag cushion 10 placed within the airbag housing 60 and a proximate end portion of which is connected to a proximate end portion of the piston 40.

Here, the tether 20 serves to slidably move the piston connected to the proximate end portion of the tether 20, in an inward direction of the airbag housing 60 within the cylinder 30 when the airbag cushion 10 is expanded and fully deployed. Such a tether 20 is a fabric strap, and is preferably connected to the airbag cushion 10 by sewing.

The cylinder 30 has at least a gas inlet 31 for fluidly communicating the interior of the airbag cushion 10 and the interior of the cylinder 30 and at least a gas outlet 32 for fluidly communicating the interior of the cylinder 30 and the exterior of the airbag housing 60. The gas inlet 31 of the cylinder 30 is positioned inside the airbag housing 60 and the gas outlet 32 of the cylinder 30 is positioned outside the airbag housing 60.

The gas inlet 31 and/or the gas outlet 32 are opened or blocked by an operation of the piston 40. That is, the piston 40 is slidably moved within the cylinder 30 substantially along the longitudinal axis of the cylinder 30 to selectively fluid-communicate the interior of the airbag cushion 10 and the exterior of the airbag housing 60, thereby controlling the internal pressure of the airbag cushion 10.

The piston 40 is disposed so as to be slidably movable substantially along the longitudinal axis of the cylinder 30 within the cylinder 30 only when the airbag cushion 10 is expanded and fully deployed, that is, when the airbag cushion 10 is fully deployed with a high pressure as shown in FIG. 4. The high pressure deployment of the airbag cushion 10 is required usually when there is a need to protect a passenger of a standard physique satisfying a normal seating condition, who is seated in a correct posture on a seat (not shown) provided within a vehicle. At this time, the passenger is standardized as an adult male, which makes it possible to effectively protect the passenger by using the airbag cushion 10 deployed with a high pressure.

On the contrary, however, it is preferable that the piston 40 is not slidably movable substantially along the longitudinal axis of the cylinder within the cylinder 30 when there is no need for a high pressure deployment of the airbag cushion 10, that is, when there is a probability that a passenger corresponding to the abnormal seating condition (OOP condition) may be injured by high pressure deployment of the airbag cushion 10. Here, the passenger in the abnormal seating condition usually refers to a child having a physique smaller than the standard physique, who is seated abnormally close to the side where the airbag module is disposed, away from the seat provided within the vehicle. In case of the passenger in such an abnormal seating condition, the low pressure deployment of the airbag cushion 10 is effective in reducing the injury caused by the deployment force of the airbag cushion 10.

In order to configure the pressure control apparatus for an airbag in accordance with the present invention such that the airbag cushion 19 may be deployed in a high pressure state for a passenger in a normal seating condition, while the airbag cushion 19 may be deployed in a low pressure state for a passenger in an abnormal seating condition, it is preferable that the tether 20 has such a length as to pull the piston 40 in the inward direction of the airbag housing 60 by the tensile force of the tether 20 upon full deployment of the airbag cushion 10.

Once the length of the tether 20 is given as above, as shown in FIG. 3, the tether 20 does not generate a tensile force as it gets loosened if the full deployment of the airbag cushion 10 is disturbed by a passenger in an abnormal seating condition (OOP condition), who is seated on the seat within the distance of full length of the tether 20, and thus the piston 40 cannot be slidably moved in the inward direction of the airbag housing 60 within the cylinder 30 due to the restoring force of the pressing member 35 applied to the piston 40. Hence, in this case, the gas inlet 31 and the gas outlet 32 are opened to discharge the gas filled in the airbag cushion 10 out of the airbag housing 60, so that the interior of the airbag cushion 10 is switched to a low pressure state, thereby effectively protecting the passenger in the abnormal seating condition.

Meanwhile, as shown in FIG. 4, in case of a passenger in a normal seating condition, i.e., the condition that a passenger is seated beyond the distance of the full length of the tether 20, the tether 20 generates a predetermined tensile force as it gets tightened upon full deployment of the airbag cushion 10 since the distal end portion of the tether 20 is connected to a portion of the inner of the airbag cushion 60, and resultantly slidably moves the piston 40 in the inward direction of the airbag housing 60 within the cylinder 30 by pulling it. The full length of the tether 20 might be the same as the horizontal diameter of the airbag cushion 10 in an exemplary embodiment of the present invention, Furthermore, the tensile force is larger than the restoring force of the pressing member 35. At this time, the gas outlet 32 is blocked by the piston 40 slidably moved leftwards in the drawing, and thus, the fluid communication between the interior of the airbag cushion 10 and the exterior of the airbag housing 60 is blocked. Therefore the gas filled in the airbag cushion 10 is kept in a high pressure state because it cannot be discharged out, thereby effectively protecting the passenger in the normal seating condition by using the airbag cushion 1 0 in the high pressure state.

The length of the piston 40 might be enough to block the gas inlet 31, the gas outlet 32, or both the gas inlet 31 and gas outlet 32 for another exemplary embodiments.

Next, in order not to block the gas inlet 31 and the gas outlet 32 normally, the piston 40 is disposed away from the gas outlet 32 within the cylinder 30 by the pressing member 35 disposed within the cylinder 30 and supporting the proximate end portion of the piston 40 in an outward direction of the airbag housing 60.

The pressing member 35 supporting the piston 40 is preferably an elastic member made of an elastic material. However, the elastic force of the pressing member 35 should be weak enough to be deformed by the tensile force of the tether 20, thus slidably moving the piston 40 in the inward direction of the airbag housing 60 in the normal seating condition as shown in FIG. 4. In contrast, the elastic force of the pressing member 35 should be strong enough to support the piston 40 in an outward direction of the airbag housing 60 in the abnormal seating condition as shown in FIG. 3.

In one embodiment of the present invention, as shown in FIGS. 3 and 4, the pressing member 35 is disposed within the cylinder 30, and a coil spring is employed as the pressing member 35, one end of which is supported by the inner side of the cylinder 30, and the other end of which supports the piston 40.

A stopper 33 is provided within the cylinder 30 which engages with the piston 40 slidably which is moved within the cylinder in the inward direction of the airbag housing 60 after full deployment of the airbag cushion 10. The stopper 33 stops the piston 40 from being returned to the home position by a restoring force of the pressing member 35.

More specifically, the stopper 33 is engaged into a stopper groove 37 complimentarily formed at a distal lower end portion of the cylinder 30 for example. An elastic member 39 for supporting a lower portion of the stopper 33 upwards is placed in the recess portion 38. Such an elastic member 39 supports the lower portion of the stopper 33, and serves to provide a predetermined elastic force to the stopper 33 so that the stopper 33 may be inserted into the stopper groove 37 or pushed back from the stopper groove 37 as the piston 30 moves in the inner direction of the airbag housing 60 in slidably-contacting with or falling apart from the piston 40

As shown in the enlarged partial view of FIG. 3, normally the stopper 33 is protruded toward the longitudinal axis of the cylinder 30 from the recess portion 39. The stopper 33 is preferably formed in a wedge shape having a lateral side to be orthogonal with respect to the longitudinal axis of the cylinder 30 and a slanted side sloped downward in the direction of the piston 40. The slanted side may face a proximate end portion of the piston 40 and the lateral side may face a distal end portion of the piston 40.

The wedge shape of the stopper 33 may permit only one forward movement but not a backward movement of the stopper 33 to prevent the stopper 33 from being released in a the high pressure state of the airbag cushion 10. In this example, the forward direction is to the inner of the airbag housing 60 and the backward direction is to the outer of the airbag housing 60 and vice verse.

Furthermore in order to protect the passenger in the normal seating condition wherein the piston 40 is slidably drawn by the tether 20 upon high pressure deployment of the airbag cushion 10, the stopper 33 serves to stop the piston 40 from sliding back in the direction of the proximate end portion of the cylinder 30. For this purpose, the stopper 33 is inserted into the stopper groove 37.

A stopping groove 37 is formed at the piston 40 which corresponds to the shape of the stopper 33 so that the stopper 33 is caught and engages with the stopping groove 37.

The thus-constructed pressure control apparatus of the airbag in accordance with the present invention is mounted by assembling the cylinder 30 with bolts 41 so as to penetrate through one side of the airbag housing 60.

Especially, the pressure control apparatus of the airbag in accordance with the present invention has the advantage that it can be used in a case where a single stage inflator 50 at one side of the airbag housing 60, the single stage inflator 50 deploying the airbag cushion 10 by an explosive force of an explosive charge caused by the ignition of one igniter, i.e., a single pressure. In other words, the pressure control apparatus has the characteristic that it can implement the same performance as in case of using a dual stage inflator using two or more igniters even in case of using the single stage inflator 50.

An operational procedure of the thus-constructed pressure control apparatus of the airbag in accordance with the present invention will be described below.

First, before deployment of the airbag cushion 10, the pressure control apparatus is set back in the outward direction of the airbag housing 60 within the cylinder 30 by the elastic force of the pressing member 35. At this time, the pressure control apparatus keeps an open state in which the gas inlet 31 and the gas outlet 32 are opened to communicate the airbag cushion 10 inside and outside.

Next, when the airbag cushion 10 is deployed, in case of protecting a passenger in an abnormal seating condition requiring a low pressure deployment of the airbag cushion 10, as shown in FIG. 3, the airbag cushion 10 does not fully inflate due to disturbance by the upper body (head/chest) of the passenger. At this time, the tensile force of the tether 20 does not work because the tether 20 does not fully extend, and resultantly, the piston 40 is not slidably moved. Thus, the airbag cushion 10 still keeps an open state in which it communicates inside and outside the airbag cushion 10, thereby ventilating the pressure formed within the airbag cushion 10 by the blow out of an explosive gas. A pressure loss caused by such pressure ventilation allows the airbag cushion 10 to be kept in a low pressure state, and thus the passenger in the abnormal seating condition is effectively protected, thus reducing the injury index of the passenger.

In contrast, in case of protecting a passenger in a normal seating condition requiring a high pressure deployment of the airbag cushion 10, as shown in FIG. 4, the airbag cushion 10 fully inflates without any disturbance by the passenger. At this time, airbag cushion 10 fully extends the tether 20 and the tether 20 pulls the piston 40 by its tensile force to slidably move the piston 40 inwards, so that the gas outlet 32 is blocked and the piston 40 is caught by the stopper 33. Thus, a pressure loss of the airbag cushion 10 is prevented and a high pressure is formed therewithin, thereby effectively protecting the passenger in the normal seating condition.

Although the pressure control apparatus of the airbag in accordance with the present invention has been described with reference to the illustrated drawings, the invention is not limited to the embodiment and drawings as described above, and it will be apparent to those skilled in the art that various modifications and embodiments can be made without departing from the technical spirit and scope of the invention. Thus the scope of this invention should be determined by the appended claims.

The thus-constructed pressure control apparatus of an airbag in accordance with the present invention has the following effects.

Compatibility is excellent because a dual stage inflator is not used but rather a conventional single stage inflator is used.

Costs are reduced because there is no need to provide an inflator in dual form.

The development schedule can be shortened because layout and design are easy due to a simple structure of the pressure control apparatus of an airbag.

What is claimed is:

1. A pressure control apparatus of an airbag, comprising:
an airbag housing;
an airbag cushion mounted to the airbag housing;
an inflator mounted to the airbag housing and supplying fluid into the airbag cushion for inflating the airbag cushion;
a cylinder disposed to pass through the interior and exterior of the airbag housing;
a piston disposed to be slidably movable within the cylinder;
a pressing member disposed within the cylinder to press the piston in an outward direction of the airbag housing; and
a tether, a distal end portion of which is connected to at least a portion of the interior of the airbag cushion and a proximate end portion of which is connected to a proximate end portion of the piston to move the piston as the airbag cushion is inflated by overcoming the pressing member,
wherein the cylinder has at least a gas inlet positioned inside the airbag housing and releasing a portion of compressed fluid in the airbag cushion into the cylinder therethrough and at least a gas outlet positioned outside the airbag housing and selectively releasing the compressed fluid flowing into the cylinder via the at least a gas inlet outside the cylinder therethrough by the piston.

2. The pressure control apparatus of claim 1, wherein the tether has such a length as to pull the piston in the inner direction of the airbag housing to block a fluid communication between the interior of the airbag cushion and the exterior of the airbag housing by a tensile force upon full deployment of the airbag cushion.

3. The pressure control apparatus of claim 2, wherein the full length of the tether is the same as the horizontal diameter of the airbag cushion.

4. The pressure control apparatus of claim 1, wherein a stopper is formed within the cylinder which engages with the piston slidably moved within the cylinder after full deployment of the airbag cushion to stop the piston from being restored to the home position by the pressing member.

5. The pressure control apparatus of claim 4, wherein the stopper is supported by an elastic member.

6. The pressure control apparatus of claim 5, wherein the stopper is configured to permit the piston to slidably move only in the inner direction of the airbag housing.

7. The pressure control apparatus of claim 6, wherein the stopper is shaped of a wedge.

8. The pressure control apparatus of claim 4, wherein a stopping groove for stopping the stopper is formed at the piston.

9. The pressure control apparatus of claim 1, wherein the pressing member is an elastic member supported by a distal end portion of the cylinder and supporting the proximate end portion of the piston.

10. The pressure control apparatus of claim 9, wherein the pressing member is a coil spring that is disposed within the cylinder.

11. The pressure control apparatus of claim 1, wherein the cylinder is assembled to the airbag housing with bolts.

12. The pressure control apparatus of claim 1, wherein the piston has at least a length enough to be slidably moved within the cylinder and fully blocks the gas outlet formed at the cylinder upon full deployment of the airbag cushion.

13. The pressure control apparatus of claim 1, wherein the piston has a length ($l_3$) longer than a width ($l_1$) of the at least a gas inlet to fully block the gas inlet formed at the cylinder upon full deployment of the airbag cushion.

14. The pressure control apparatus of claim 1, wherein piston has a length ($l_3$) longer than a width ($l_2$) of the at least a gas outlet to fully block the gas outlet formed at the cylinder upon full deployment of the airbag cushion.

* * * * *